Dec. 1, 1942.　　　J. F. HARRISON　　　2,303,738
TRANSMISSION ASSEMBLY
Filed July 3, 1942　　　5 Sheets-Sheet 1

Inventor
John F. Harrison
By Alexander Dowell
Attorneys

Dec. 1, 1942.   J. F. HARRISON   2,303,738
TRANSMISSION ASSEMBLY
Filed July 3, 1942   5 Sheets-Sheet 2

Inventor
John F. Harrison
Alexander Dowell
Attorneys

Dec. 1, 1942. J. F. HARRISON 2,303,738
TRANSMISSION ASSEMBLY
Filed July 3, 1942 5 Sheets-Sheet 3

Inventor
John F. Harrison
By Alexander Dowell
Attorneys

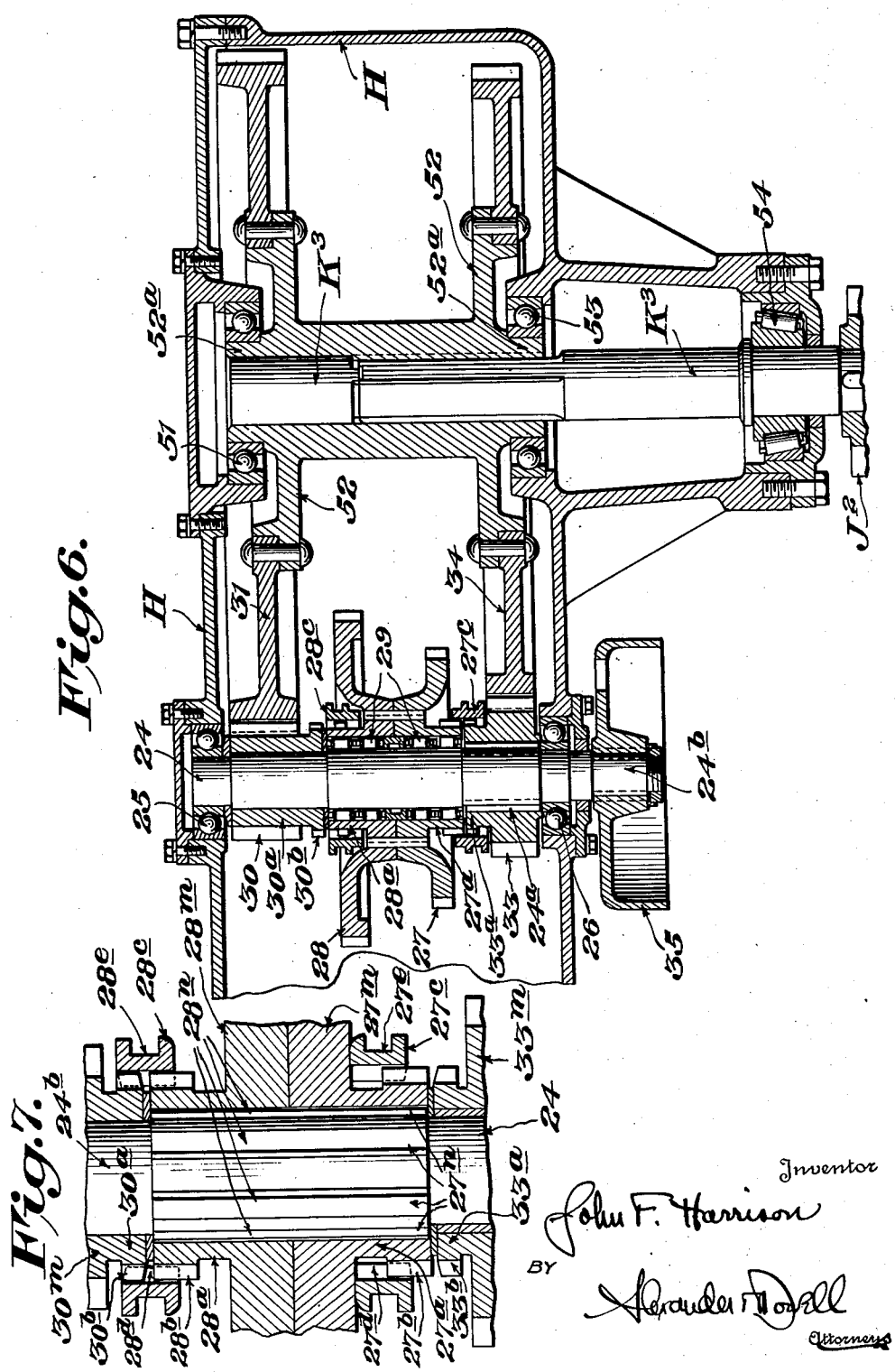

Patented Dec. 1, 1942

2,303,738

UNITED STATES PATENT OFFICE 2,303,738

TRANSMISSION ASSEMBLY

John F. Harrison, Springfield, Ohio, assignor to The Buffalo-Springfield Roller Co., Springfield, Ohio, a corporation of Ohio Application July 3, 1942, Serial No. 449,651

20 Claims. (Cl. 74—327)

This invention relates to road rollers of the three-wheel and tandem types, and the principal object thereof is to provide a four-speed T-type or L-type transmission assembly particularly adapted for use in road rollers of the above types, said transmission involving the use of three parallel shafts, to wit, a clutch shaft, one countershaft, and an output shaft, with gearing arranged on said shafts in such manner as to permit four different speeds utilizing a minimum number of gears and bearings, and involving a minimum amount of machining of parts of the transmission, only eight gears arranged on the three shafts being necessary.

Another object of the invention is to provide a four-speed T-type transmission for use in 3 wheel type road rollers or the like involving the use of three shafts, the output shaft carrying a rotatable differential gear hub carrying two gears selectively driven directly by two pinions on the one countershaft, and the clutch shaft carrying a two-gear cluster selectively meshing with a two-gear cluster on the one countershaft, both pinions on the countershaft being capable of being driven by the two-gear cluster on the countershaft in such manner that a brake drum may be mounted on the countershaft and will always be available for braking purposes regardless of whether or not the transmission is in neutral since the brake drum is at all times directly geared to the differential gear hub or to the output shaft gear hubs of the transmission, thus rendering it impossible to disengage the brake drum from the output shaft or shaft gear hubs.

A further object of the invention is to provide a modified four-speed L-type transmission adapted for use on tandem type road rollers in which the differential gear hub and one of the output shaft sections above referred to are omitted, the transmission involving the use of a clutch shaft, one countershaft, and an output shaft, the output shaft carrying two gears which mesh at all times with two pinions on the countershaft, which countershaft carries the two-gear cluster meshing with the two-pinion cluster on the clutch shaft, and which countershaft carries the brake drum and is continually in mesh with the drive shaft so as to be always available for braking purposes.

Other minor objects of the invention will be hereinafter set forth.

I will explain the invention with reference to the accompanying drawings which illustrate several practical embodiments thereof to enable others familiar with the art to adopt and use the same; and will summarize in the claims, the novel features of construction, and novel combinations of parts, for which protection is desired.

In said drawings:

Fig. 6 is a horizontal section showing the countershaft and output shaft of a four-speed L-type transmission in which the parts, except those associated directly with the output shaft, are interchangeable, with the parts of the T-type transmission.

Fig. 7 is an enlarged detail section.

Figure 1:
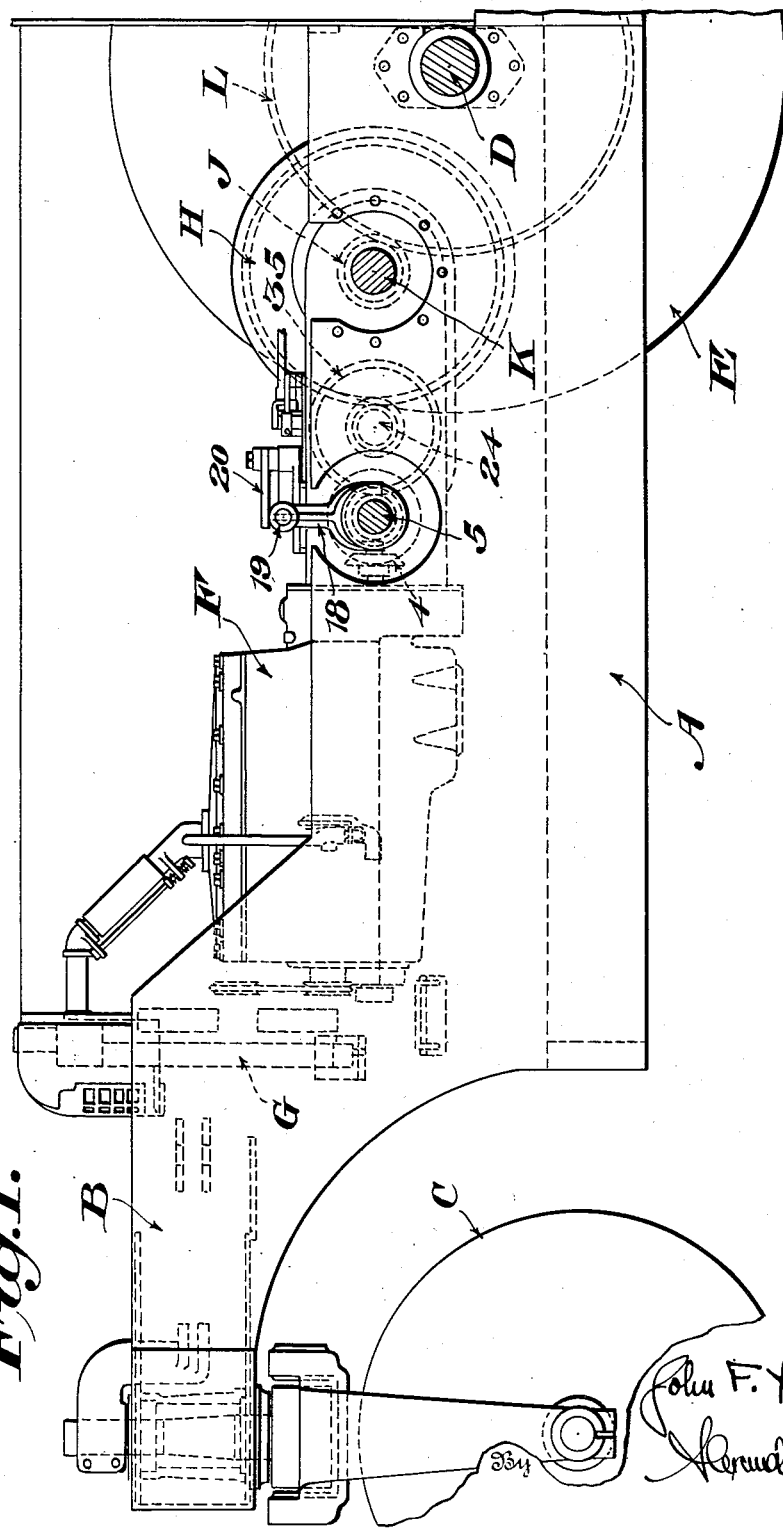
Fig. 1 is a side elevation of a three-wheel road roller with one rear drive wheel removed, and showing the arrangement of motor and transmission, also indicating the gearing between the rear wheels and the output shaft sections of the transmission.
Figure 2:
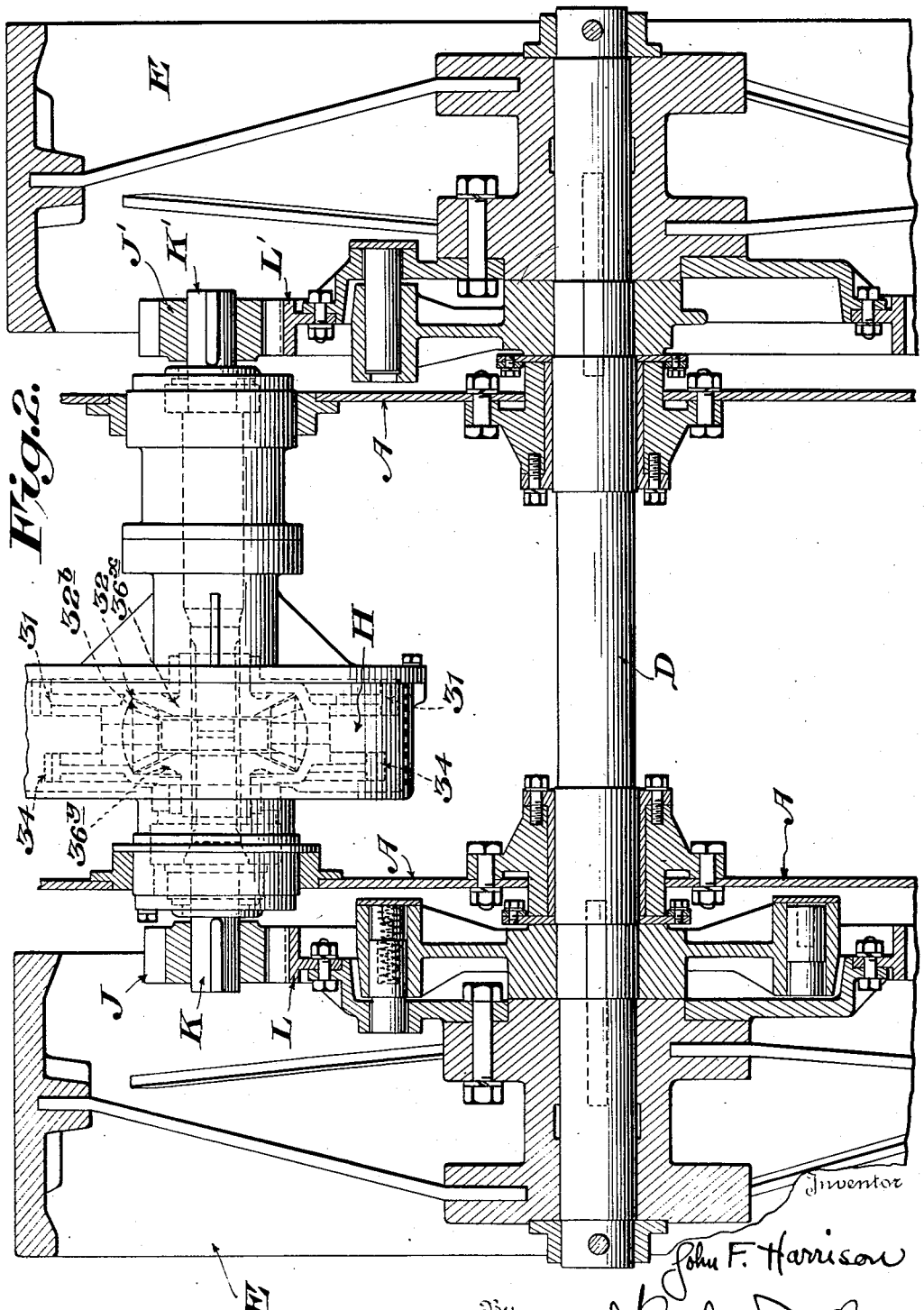
Fig. 2 is a rear elevation of the road roller shown in Fig. 1 showing more clearly the arrangement of the transmission, differential housing, and drive from the output shaft sections to the rear drive wheels of the roller.

As shown in Figs. 1 and 2, the three-wheel type road roller frame comprises side plates A—A each having a gooseneck B at its forward end carrying the trunnions for the yoke of the front steering roll C, said frame also having a rear axle D carrying rear drive wheels E—E disposed at opposite sides of the frame in the customary manner. Mounted in the roller frame is an internal combustion engine F which may be watercooled by radiator G, said motor F driving the rear drive wheels E through my novel T-type transmission H through the drive pinions J carried on the split drive output shaft sections K, which mesh with drive pinions L carried by the rear drive wheels E in the customary manner.

My invention provides for such type of road roller or other vehicle a novel four-speed transmission involving the use of three parallel shafts, such arrangement thus providing a minimum number of shafts, bearings and gears, only eight such gears being necessary to effect the four-speed drive either forward or reverse.

Figure 3:
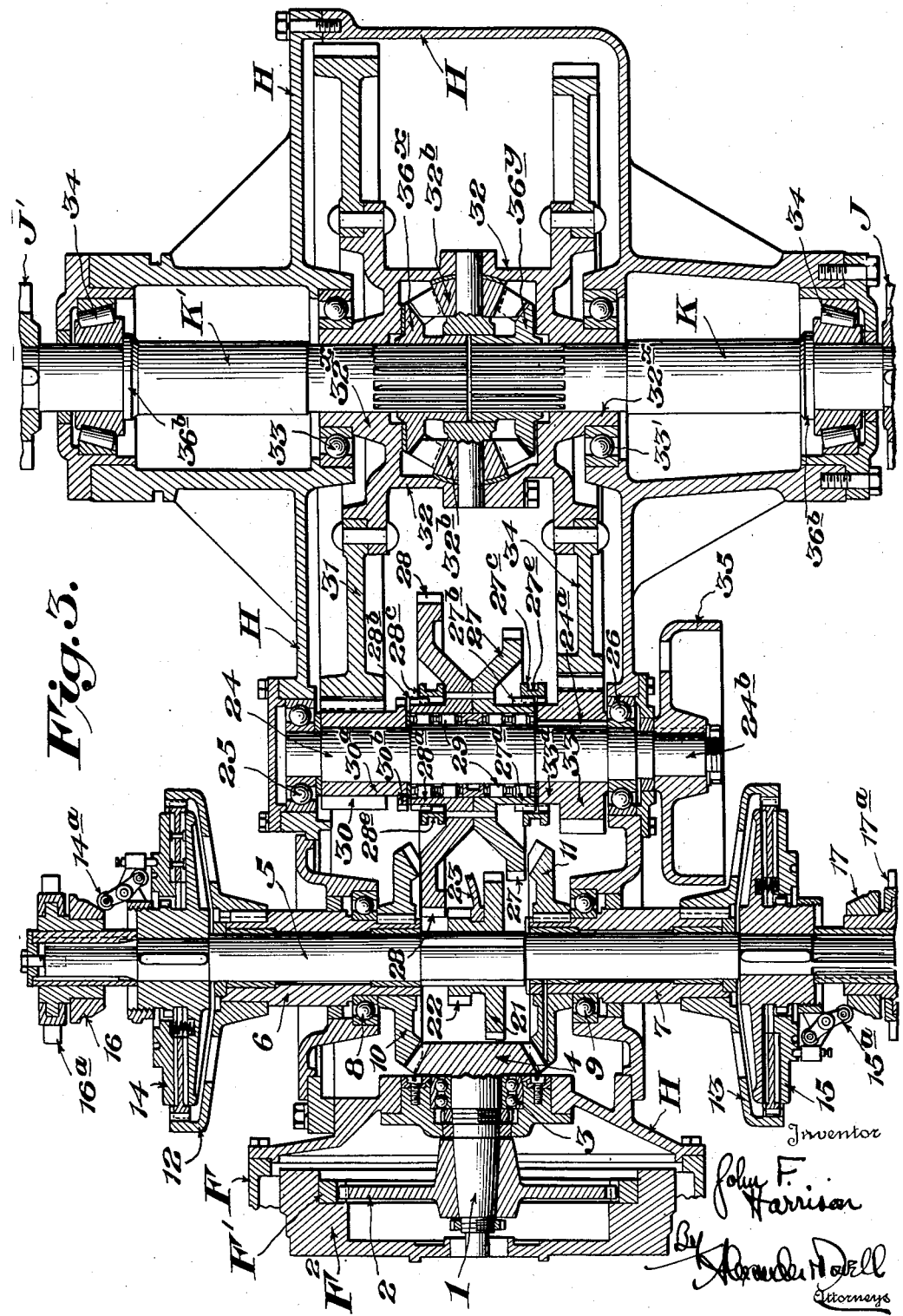
Fig. 3 is an enlarged horizontal section through the four-speed T-type transmission of the road roller shown in Figs. 1 and 2, showing my preferred arrangement of the four gears on the countershaft.

As shown in Fig. 3 my preferred form of transmission comprises a casing H (Figs. 1, 2 and 3) which is removably secured to the rear end of the motor housing F in the usual manner, said casing having at its front end a shaft 1 carrying a gear 2 in constant mesh with the internal gear F' of the engine fly wheel F2 (Fig. 3), shaft 1 being mounted in antifriction bearings 3 in the front end of transmission casing H and being disposed coaxially of the engine shaft (not shown).

Within housing H and carried by the shaft 1 is an input bevel pinion 4, and journaled in the sides of transmission housing H is a clutch shaft 5 extending entirely through the sides of said housing, said shaft 5 carrying loose clutch sleeves 6 and 7 respectively adjacent its ends, which sleeves are journaled in antifriction bearings 8 and 9 mounted respectively in the side walls of housing H. The inner ends of sleeves 6 and 7 carry the reversing pinions 10 and 11, respectively, which mesh directly with input bevel pinion 5 to drive sleeves 6 and 7 in opposite directions.

Clutch sleeves 6 and 7 carry clutch driving drums 12 and 13 respectively which are keyed thereon, and on clutch shaft 5, within the drums 12 and 13, are clutch hubs 14 and 15 respectively carrying actuators 14a and 15a respectively cooperating with axially shiftable cam members 16 and 17, having fingers 16a, 17a respectively engaged by yokes 18 (Fig. 1) depending from a slide bar 19 actuated by lever 20, whereby when the slide bar is shifted either clutch drum 12 or 13 will directly drive clutch shaft 5 depending to which side the slide bar 19 is moved, and when the slide bar is in mid-position both clutch drums 12 and 13 will be disengaged from their hubs 14 and 15 to permit the clutch shaft 5 to idle, while however the sleeves 6 and 7 are constantly driven by the input pinion 4 in opposite directions. The particular arrangement of the clutch sleeves 6 and 7 and the means for locking the clutch shaft 5 thereto are preferably but not necessarily similar to that disclosed in the copending application of Carl F. Greiner, Serial No. 424,997, filed December 30, 1941, and therefore needs no detailed description herein, the same forming no part of my present invention.

On clutch shaft 5 between the reversing gears 10 and 11 is a two-gear cluster 21, 22 which is splined to shaft 5, said cluster consisting of a large pinion 21 and a small pinion 22 actuated by a gear shaft yoke 23 (Fig. 3) actuated from suitable controls adjacent the operator's seat of the road roller, whereby said cluster gear can be shifted axially of shaft 5.

Disposed adjacent to and parallel with clutch shaft 5 is a countershaft 24, which shaft is journaled in antifriction bearings 25, 26 mounted in the side walls of transmission housing H. On countershaft 24, embracing the cluster gear 21, 22 of clutch shaft 5, is a cluster gear consisting of a gear 27 adapted to mesh with cluster pinion 21, and a second gear 28 adapted to mesh with cluster pinion 22, cluster gear 27, 28 floating upon countershaft 24, the same being mounted on roller or other antifriction bearings 29 whereby same may be driven at two different speeds according to which of the cluster pinions 21, 22 is in mesh with the cluster gears 27, 28.

Figure 4:
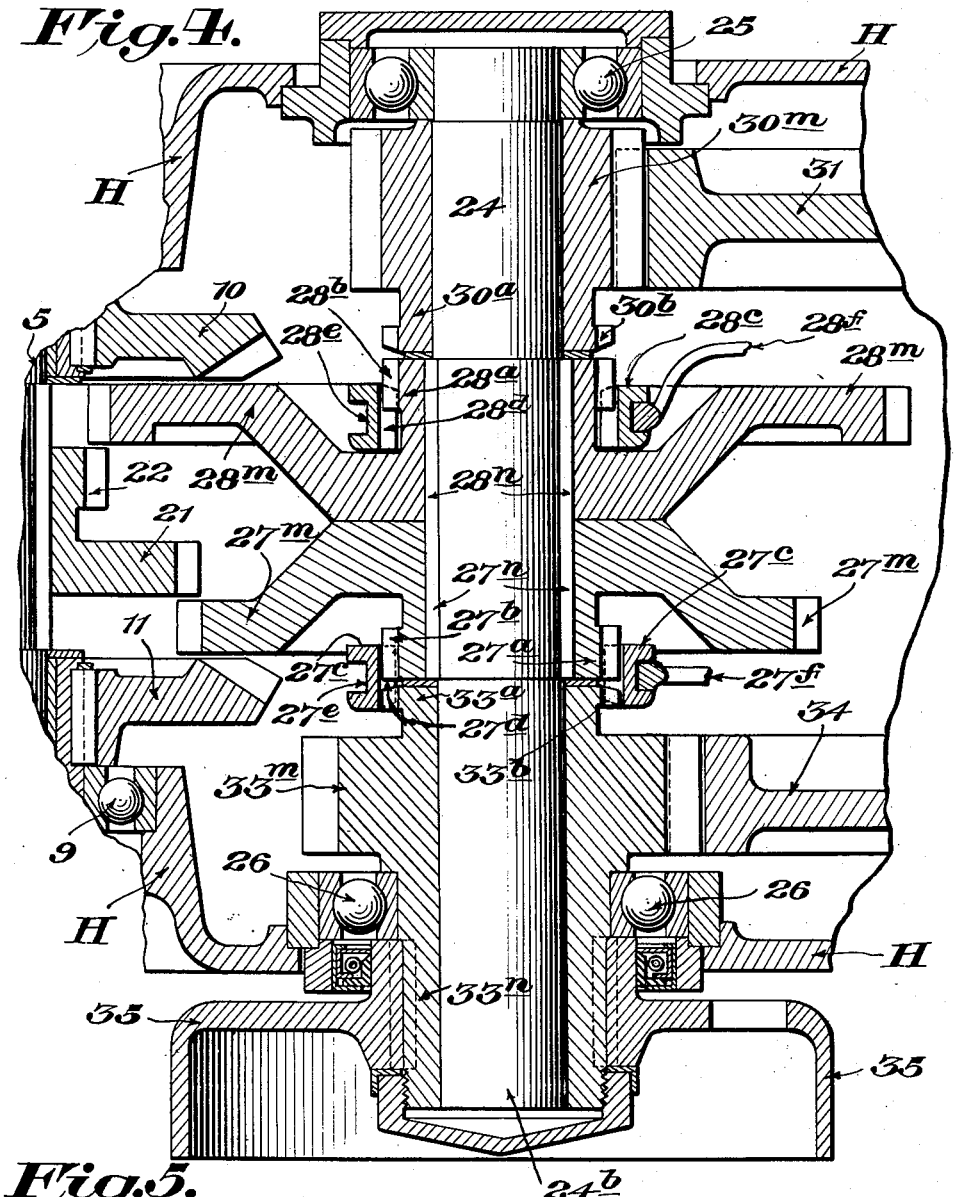
Fig. 4 is a plan view showing a modified arrangement or mounting of the four gears on the countershaft.

Cluster gears 27 and 28 have hub extensions 27a and 28a respectively provided at their outer ends with exterior teeth 27b, 28b, shown more particularly in Figs. 4 and 7, and slidably mounted upon the hub extensions 27a, 28a are clutch collars 27c, 28c respectively provided with internal teeth 27d, 28d (Figs. 4 and 7) meshing with the teeth 27b, 28b, the length of clutch collars 27c, 28c being such that when the clutch collars are moved inwardly towards the center of cluster gear 27, 28 the same will be disposed inside the outer ends of their respective teeth on the hub extensions 27a, 28a, and when shifted into mid-position of their strokes both cloth collars 27c, 28c will be in neutral position, engaged only with their respective teeth 27b, 28b. Each clutch collar 27c, 28c is provided with an annular recess 27e, 28e in its outer face engaged by clutch shifter yokes 27f, 28f which are connected together by a sliding rod (not shown) in such a manner that when in mid-position both clutches will be disengaged, and when either clutch collar is in fully retracted clutch disengaging position the other clutch collar will be in fully projected clutching position, as clearly indicated in Figs. 4 and 7, said clutch rod being actuated by a common lever operated from the position adjacent the operator's seat.

Loosely mounted on countershaft 24 beside the cluster gear 28 is a pinion 30 (Fig. 3) having a hub extension 30a provided with teeth 30b disposed directly adjacent to and opposite the teeth 28b of hub extension 28a of cluster gears 28, so that when the related clutch collar 28c is projected by the clutch yoke, the teeth 28d of collar 28c will lock together the teeth 30b and 28b of gear 30 and gear 28 respectively, so that rotation of cluster gear 27, 28 will correspondingly rotate pinion 30. Pinion 30 meshes constantly with output gear 31 mounted directly upon the differential gear hub 32, hereinafter described, to cause the housing 32 to be rotated by pinion 30 when the latter is locked to the cluster gear 27, 28.

Opposite and adjacent to cluster gear 27 (Fig. 3) is a pinion 33 of larger diameter than pinion 30, said pinion 33 however being locked by key 24a directly to countershaft 24. Pinion 33 has a hub extension 33a (Figs. 3 and 4) provided with teeth 33b disposed directly opposite the teeth 27b of cluster gear 27 so that when the related clutch ring 27c is projected, as shown in Figs. 3 and 4, the teeth 27d thereof will lock the teeth 33b and 27b together to cause countershaft 24 to be rotated by and with the cluster gear 27. Pinion 33 constantly meshes with a gear 34 also directly carried by the differential gear hub 32 to cause the hub to rotate by and with the gear 34.

One end 24b of countershaft 24 projects through the side of the casing H (Fig. 3) and carries a brake drum 35 cooperating with suitable braking shows (not shown), said brake drum 35, by reason of the keyed connection of pinion 33 on shaft 24, being constantly geared to the differential gear hub 32 so that regardless of whether the transmission is positioned in "neutral" or otherwise, the brake drum 35 may at all times be utilized for the purpose of braking the movement of the roller.

In the T-type transmission shown in Fig. 3, the output shaft is formed in two sections K, K', the inner ends of which enter the hubs 32x of the differential gear hub 32 and are journaled therein, the hubs 32x of the differential being journaled in antifriction bearings 33 mounted in the side walls of transmission housing H. The outer ends of the output shaft sections K, K' are mounted in antifriction bearings 34 mounted in shaft housings formed by lateral extensions of the transmission housing H, as shown in Fig. 3, and carry annular shoulders 36b respectively engaging the inner faces of bearings 34 so as to prevent the shaft sections K, K' from movement axially of the differential gear hub 32. Differential gear hub 32 carries one or more differential pinions 32b meshing constantly with side gears 36x and 36y keyed respectively to the inner ends of the output shaft sections K, K', within the housing 32.

On the outer ends of the output shaft sections K, K' respectively are the drive pinions J, J' respectively (Figs. 1, 2 and 3) which directly mesh with the drive gears L, L' carried by the rear rolls E—E of the road roller, means being provided to lock out or prevent the differential from functioning by locking both rolls E to the common axle D, to prevent slippage of the rolls E—E in event one roll should become mired and start spinning. The particular means for connecting and disconnecting the gear L from its related drive roll E forms no part of my present invention, and same preferably being similar to that set forth in United States Letters Patent (of Carl F. Greiner) No. 2,240,887 issued May 6, 1941.

In operation:

By the construction shown in Figs. 1, 2 and 3, a simple and efficient four-speed transmission is provided involving the use of three shafts, i. e., a clutch shaft 5, one countershaft 24, and a pair of output shaft sections K, K' only. The clutch shaft carries oppositely rotating clutch sleeves 6 and 7 which are continuously rotated by and with the input bevel pinion 4. By actuation of the clutch lever 20, the clutch shaft 5 is caused to rotate in either forward or reverse direction according to the positioning of said lever, and thus causing rotation in either direction of the shiftable cluster gear 21, 22, which may be positioned into "neutral" or may be shifted by clutch yoke 23 to mesh its pinions with either gear of the cluster gear 27 or 28 to drive cluster gear 27, 28 which floats upon countershaft 24. When clutch ring 28c is engaged with the loose pinion 30 floating on countershaft 24, the pinion will be rotated independently of rotation of the countershaft 24 since clutch ring 27c will then be disengaged from pinion 33 which is keyed to countershaft 24, and thus pinion 30 will rotate gear 31 and the differential gear hub 32 accordingly, which differential directly carries the differential carries the differential pinions 32b, which mesh with differential gears 36x and 36y which are disposed within the differential gear hub and are respectively splined or keyed to the inner ends of the output shaft sections K, K'. The gear 34 during rotation of differential gear hub housing 32 will drive pinion 33 which is keyed to countershaft 24 so that the brake drum 35 will be correspondingly rotated, and thus any braking action on brake drum 35 will serve to brake the movement of the vehicle, said brake drum being constantly in mesh with the final drive K, K' of the transmission.

Obviously pinion 30 when clutched to the cluster gear 27, 28 may be driven at two speeds depending upon whether cluster gear 27 is engaged with cluster pinion 21 on the clutch shaft, or whether cluster gear 28 is engaged with cluster pinion 22, and thus pinion 30 may impart two different speeds to the differential gear hub 32.

When clutch ring 27c is actuated to lock the pinion 33 thereto, the opposite pinion 30 will merely float upon the countershaft 24. Counter- shaft 24 however will be directly driven by pinion 33, owing to its keyed connection thereto, and pinion 33 will rotate the differential gear hub 32 through the gear 34 which is of different diameter or size than gear 31. Obviously pinion 33 may be operated at two different speeds depending upon whether cluster gears 21, 27 or cluster gears 22, 28 are meshing, thus imparting two additionaly speeds of rotation to the differential gear hub 32.

Again, since the brake drum 35 is connected through gears 33, 34 to the differential gear hub 32, the drum 35 may always be utilized for braking the movement of the vehicle.

The above construction thus provides for a four-speed T-type transmission utilizing a clutch shaft, a single countershaft, and a divided output shaft, in which the differential gear hub carries two gears directly meshing with pinions on the countershaft, which countershaft carries a two-gear cluster adapted to mesh with a two-gear cluster on the clutch shaft. Such construction maintains the number of gears, bearings and shafts at a minimum, and provides a simple and efficient T-type transmission designed for utmost simplicity without sacrificing strength.

Figure 5:
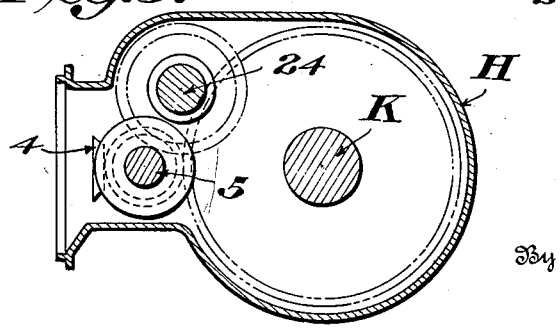
Fig. 5 is a horizontal sectional view showing a modified arrangement of the shafting of the transmission to effect foreshortening of the length thereof.

In Fig. 1 the clutch shaft 5, countershaft 24 and output shaft K are all shown as having their axes disposed in the common plane. Obviously such design may be modified as shown in Fig. 5, in which the clutch shaft 5 and the output shaft K are disposed in a common plane, while the countershaft 24 is considerably offset above said plane, thereby effecting a material foreshortening of the length of the transmission housing H, and thus reducing its size and effecting a saving of space and material. Other arrangements of shafts 5, 24, and K however may be utilized, as long as the shafts are maintained in parallel relation.

Figs. 4 and 7 show a modified arrangement of the gearing on the countershaft 24. In this modification the countershaft 24 has one end journaled in antifriction bearings 25 in one side wall of the transmission housing H, while the opposite end is journaled in a hub extension 33n of the pinion 33m (which corresponds with pinion 33 of Fig. 3), said hub extension being journaled in antifriction bearings 26 mounted in the opposite wall of housing H, and the extension 36n extending through said side of the housing and directly having keyed thereon the brake drum 35, so that the drum 35 will rotate at all times with the pinion 33m. In this modification the cluster gears 27m, 28m are directly keyed by keys 27n, 28n to the countershaft 24 for rotation therewith, whereby shaft 24 may be rotated at two different speeds, according to whether the cluster gears 21, 27m are in mesh, or the cluster gears 22, 28m are in mesh.

Cluster gears 27m, 28m (Fig. 4) also carry the hub extensions 27a, 28a as in Fig. 3, which extensions are provided with teeth 27b, 28b; and carry the clutch rings 27c, 28c which are provided with the teeth 27d, 28d respectively meshing with the teeth 27b, 28b and operated by the clutch yokes 27f, 28f, which are connected to a common operating lever for simultaneous movement to selectively project either clutch ring 27c or 28c.

On countershaft 24 (Figs. 4 and 7) beside cluster gear 28m is the loose pinion 30m similar in all respect to the pinion 30 of Fig. 3 and operating in the same manner. The pinion 33m however adjacent the cluster gear 27 is loosely mounted on countershaft 24 instead of being keyed thereto as in Fig. 3. However, when clutch ring 27c locks the pinion 33m to cluster gear 27m, the pinion 33m will drive the gear 34 and rotate differential gear hub 32 in the same manner that pinion 33 above described in connection with Fig. 3 rotates gear housing 32. This construction however necessitates the provision of the hub extension 33n for the pinion 33m, and thus is somewhat more expensive than the arrangement shown in Fig. 3. However, since the differential gear hub 32 is always connected through gears 34 and pinion 33m with the brake drum 35, through the hub extension 33n of pinion 33m, the braking action of drum 35 is always available to arrest movement of the vehicle irrespective of whether the differential gear hub 32 is being driven by the gear 31 or 34, or the transmission is in "neutral."

In Fig. 6, a modification of the transmission is illustrated, same forming an L-type (rather than a T-type) transmission, the L-type being particularly adapted for road rollers of the tandem type, in which a single bevel pinion J2 on a one-piece output shaft K3, drives a ring gear mounted on the end of the drive roll of the tandem roller.

In this modification the same arrangement and parts described (Figs. 1–5) for the clutch shaft 5 and the countershaft 24 is used, the parts being interchangeable. However, as regards the output shaft a single output shaft K3 rather than a divided output shaft (K, K') is required. In the L-shaped transmission (Fig. 6) the output shaft K3 is journaled or splined in the hub 52a of a gear hub 52 so as to be driven thereby, suitable means being provided for preventing axial movement of the inner end of shaft K3 in said hub, the hub 52a of gear hub 52 being journaled in antifriction bearings 51, 53 mounted in the side walls of transmission housing H.

Gear hub 52 has secured thereto the two gears 31 and 34 which operate in the same manner described in connection with the preceding figures (1–5) to rotate the gear hub 52 to impart four different speeds of rotation thereto. The outer end of output shaft K3 is journaled in antifriction bearings 54 in a shaft housing formed by a lateral extension of housing H through which the shaft projects, the same carrying a bevel gear J2 on its outer end directly meshing with a ring gear on the end of the drive roll of the tandem roller.

The above design provides a construction in which the majority of identical parts may be utilized in the assembly of the T-type transmission and the L-type transmission, it being merely necessary to replace the differential gear hub 32 of the T-type transmission with the gear hub 52 of the L-type transmission, and to utilize the single output shaft K3 rather than a divided output shaft K, K', shown in Figs. 1 to 5, the rear end section of housing H being modified accordingly.

The operation of the brake drum 35 in Fig. 6 is identically the same as that shown and above described in connection with Figs. 3 and 4, the brake drum being geared to the final drive of the transmission, thus rendering it impossible to disengage the brake drum at any time from the output shaft K3.

In the form shown in Fig. 6 the L-type transmission again involves the use of a single clutch shaft, a single countershaft, and a single output shaft, and the gear hub 52 is provided with two driving gears 31, 34 meshing with two gears or pinions 30, 33 (or 30m, 33m) on the countershaft, which countershaft 24 carries a two-gear cluster 27, 28 (or 27m, 28m) adapted to be brought into mesh with a two-gear cluster 21, 22, on the clutch shaft 5; and thus the output shaft K3 may be driven at four different speeds while utilizing three parallel shafts, and a minimum number of gears and bearings, only eight gears arranged on the three shafts being necessary.

Another decided advantage present in my transmission assembly resides in the fact that there are two distinct trains of gears available through the transmission at all times, and that when one train of gears is driving under load the other gear train is merely idling without load, or in the case of the first two clusters, not even engaged. In previous transmissions, excepting the type where the so-called "high" gear is a direct drive through the transmission and none of the gears operating, such as in automobile transmissions, there are at least one or two gear sets or trains which drive under load all the time regardless of which selective gear is being used, i. e., whether low, intermediate or high gear. As the life factor of the various gear sets or trains in a transmission are carefully considered while undergoing design, it is apparent any gear set in the transmission which is constantly used would require a greater life factor than those selective sets which are not in constant use. Since the life factor has direct bearing on the cost of the gears, my arrangement obviously provides an assembly at lower cost and having longer life. For example, the bevel gears in my design are used constantly regardless of which set of spur reduction gears are engaged, and these bevel gears only would require a relatively high life factor, or a life factor higher than any of the spur gears.

I do not limit my invention to the exact forms shown in the drawings, for obviously changes may be made therein within the scope of the claims.

I claim:

1. A transmission, comprising a pair of oppositely rotating sleeves; a clutch shaft journaled in said sleeves; means for selectively locking the shaft to said sleeves; a cluster gear splined on said shaft; a countershaft disposed parallel with said clutch shaft; a second cluster gear on said countershaft adapted to mesh selectively with the first cluster; pinions of different size on said countershaft at opposite sides of said second cluster; means for selectively locking said pinions to said second cluster; an output shaft disposed parallel with said countershaft; a hub adapted to drive said output shaft; and a pair of gears of different size on said hub constantly meshing with said respective pinions on the countershaft.

2. In a transmission as set forth in claim 1, a bevel drive pinion; bevel gears mounted on the inner ends of said sleeves respectively and meshing with said drive pinion at opposite sides thereof; said first cluster gear being disposed between said sleeves; and said means for selectively locking the clutch shaft to said sleeves comprising clutch drums mounted on the outer ends of said sleeves respectively, and clutch hubs mounted on said clutch shaft and adapted to engage said respective clutch drums, and means for shifting the clutch hubs.

3. In a transmission as set forth in claim 1, said second cluster gear and said countershaft pinions having hub extensions provided with teeth; and said means for locking the countershaft pinions to the second cluster gear comprising clutch rings axially movably mounted on said cluster hub extensions and having internal teeth meshing with the teeth of the cluster hub extensions and adapted, when shifted, to also engage the teeth of the hub extensions of the adjacent pinions; and means for shifting the clutch rings.

4. In a transmission as set forth in claim 1, said transmission being of T-type, and said output shaft being divided into aligned shaft sections; a differential between said shaft sections including said hub rotatably mounted upon said shaft sections and carrying said pair of gears which mesh with the countershaft pinions.

5. In a transmission as set forth in claim 1, said transmission being of L-type, and said hub being rotatably journaled, and said output shaft being fixedly mounted in said hub for rotation therewith and projecting beyond one end thereof.

6. A transmission, comprising a pair of oppositely rotating sleeves; a clutch shaft journaled in said sleeves; means for selectively locking the shaft to said sleeves; a cluster gear splined on said shaft; a countershaft disposed parallel with said clutch shaft; a second cluster gear on said countershaft adapted to mesh selectively with the first cluster; pinions of different size on said countershaft at opposite sides of said second cluster; means for selectively locking said pinions to said second cluster; an output shaft disposed parallel with said countershaft; a hub adapted to drive said output shaft; a pair of gears of different size on said hub constantly meshing with said respective pinions on the countershaft; and a brake drum rotatable with one of said countershaft pinions, whereby said drum is constantly geared to said output shaft.

7. In a transmission as set forth in claim 6, said second cluster gear floating on said countershaft between said countershaft pinions; one of said pinions being keyed to said countershaft to cause the latter to rotate therewith; and said brake drum being keyed to said countershaft.

8. In a transmission as set forth in claim 6, said second cluster gear being keyed to said countershaft; and said countershaft pinions floating on said countershaft; and one of said pinions carrying the brake drum.

9. In a transmission as set forth in claim 6, a bevel drive pinion, bevel gears mounted on the inner ends of said sleeves respectively and meshing with said drive pinion at opposite sides thereof; said first cluster gear being disposed between said pair of bevel gears; and said means for selectively locking the clutch shaft to said sleeves comprising clutch drums mounted on the outer ends of said sleeves respectively, and clutch hubs mounted on said clutch shaft and adapted to engage said respective clutch drums, and means for shifting the clutch hubs.

10. In a transmission as set forth in claim 6, said second cluster gear and said countershaft pinions having hub extensions provided with teeth; and said means for locking the countershaft pinions to the second cluster gear comprising clutch rings axially movably mounted on said clutch hub extensions and having internal teeth meshing with the teeth on the cluster hub extensions and adapted, when shifted, to also engage the teeth on the hub extensions of the adjacent pinions; and means for shifting the clutch rings.

11. In a transmission as set forth in claim 6, said transmission being of T-type, and said output shaft being divided into aligned shaft sections; and a differential between said shaft sections including said hub rotatably mounted upon said shaft sections and carrying said pair of gears which mesh with the countershaft pinions.

12. In a transmission as set forth in claim 6, said transmission being of L-type, and said hub being rotatably journaled, and said output shaft being fixedly mounted in said hub for rotation therewith and projecting beyond one end thereof.

13. A transmission having four speeds, forward and reverse, comprising a pair of spaced aligned sleeves; a clutch shaft journaled in said sleeves; a bevel drive pinion; a pair of bevel gears mounted on the inner ends of said sleeves respectively and meshing with said drive pinion at opposite sides thereof; means for selectively locking the shaft to said sleeve; a two-gear cluster splined on said shaft between the bevel gears; a countershaft disposed parallel with said clutch shaft; a second two-gear cluster on said countershaft adapted to mesh selectively with the first cluster; pinions of different size on said countershaft at opposite sides of said second cluster; means for selectively locking said pinions to said second cluster; an output shaft disposed parallel with said countershaft; a hub adapted to drive said output shaft; and a pair of gears of different size on said hub constantly meshing with said respective pinions on the countershaft.

14. In a transmission as set forth in claim 13, said second cluster and said countershaft pinions having hub extensions provided with teeth; and said means for locking the countershaft pinions to the second cluster comprising clutch rings axially movably mounted on said cluster hub extensions and having internal teeth meshing with the teeth on the cluster hub extensions and adapted, when shifted, to also mesh with the teeth on the hub extensions of the adjacent pinions; and means for shifting the clutch rings.

15. In a transmission as set forth in claim 13, said transmission being of T-type, and said output shaft being divided into aligned shaft sections; and a differential between said shaft sections including said hub rotatably mounted upon said shaft sections and carrying said pair of gears which mesh with the countershaft pinions.

16. In a transmission as set forth in claim 13, said transmission being of L-type, and said hub being rotatably journaled, and said output shaft being fixedly mounted in said hub for rotation therewith and projecting beyond one end thereof.

17. A transmission having four speeds, forward and reverse, and having a brake, said transmission comprising a pair of spaced aligned sleeves; a clutch shaft journaled in said sleeves; a bevel drive pinion, a pair of bevel gears mounted on the inner ends of said sleeves respectively and meshing with said drive pinion at opposite sides thereof; means for selectively locking the shaft to said sleeves; a two-gear cluster splined on said shaft between the bevel gears; a countershaft disposed parallel with said clutch shaft; a second two-gear cluster on said countershaft adapted to mesh selectively with the first cluster; pinions of different size on said countershaft at opposite sides of said second cluster; means for selectively locking said pinions to said second cluster; an output shaft disposed parallel with said countershaft; a hub adapted to drive said output shaft; a pair of gears of different size on said hub constantly meshing with said respective pinions on the countershaft; and a brake drum rotatable with one of said pinions whereby said drum is constantly geared to said output shaft.

18. In a transmission as set forth in claim 17, said second cluster floating on said countershaft between said countershaft pinions; one of said pinions being keyed to said countershaft to cause the latter to rotate therewith; and said brake drum being keyed to said countershaft.

19. In a transmission as set forth in claim 17, said second cluster being keyed to said countershaft; and said countershaft pinions floating on said countershaft; and one of said pinions having a hub extension carrying the brake drum.

20. In a transmission as set forth in claim 17, said second cluster and said countershaft pinions having hub extensions provided with teeth; and said means for locking the countershaft pinions to the second cluster comprising clutch rings axially movably mounted on said cluster hub extensions and having internal teeth meshing with the teeth on the cluster hub extensions and adapted, when shifted, to also mesh with the teeth on the hub extensions of the adjacent pinions; and means for shifting the clutch rings.

JOHN F. HARRISON.